ns  4,006,967
Kenan et al.  Feb. 8, 1977

[54] DIRECTING OPTICAL BEAM

[75] Inventors: Richard P. Kenan; Carl M. Verber, both of Columbus; Van E. Wood, Delaware, all of Ohio

[73] Assignee: Battelle Memorial Institute, Columbus, Ohio

[22] Filed: Apr. 23, 1975

[21] Appl. No.: 570,836

[52] U.S. Cl. .................. 350/160 R; 350/96 WG
[51] Int. Cl.² .......................... G02F 1/16
[58] Field of Search ......... 350/160, 161, 96 WG; 331/94.5 M; 332/7.51

[56] References Cited
UNITED STATES PATENTS

| 3,814,498 | 6/1974 | Tomlinson et al. | 350/96 WG |
| 3,884,549 | 5/1975 | Wang et al. | 331/94.5 M |
| 3,912,363 | 10/1975 | Hammer | 350/96 WG |

*Primary Examiner*—William L. Sikes
*Attorney, Agent, or Firm*—Philip M. Dunson

[57] ABSTRACT

Methods and apparatus for directing a beam of optical radiation toward a selected location and modulating the intensity thereof at the location by directing the beam over a path that includes a Bragg grating, and selectively modifying the angle between the direction at which the beam enters the Bragg grating and a direction of Bragg incidence of the grating by applying an electric or acoustic field to change the index of refraction in a portion of the path. An electric field may be applied either by interdigital electrodes at the grating, to change the Bragg angle thereof, or by electrodes at different angles across an earlier portion of the path, to change the direction at which the beam enters the grating. An acoustic field may be applied in an analogous manner. Useful for modulating and switching in planar wave guides and bulk material.

23 Claims, 7 Drawing Figures

DIRECTING OPTICAL BEAM

BACKGROUND AND INTRODUCTION

A number of electro-optic and acousto-optic switches and deflectors have been developed in both bulk and thin-film forms. Many of these have rather high efficiencies, but most are characterized by having intrinsically small angular deflection ranges. In this introductory section, we report initial experimental results on a two-position electro-optic switch which can be fabricated both in a bulk configuration and in thin-film configurations suitable for integrated optics applications. The switch has the advantage of being able to function at any, arbitrarily large, predetermined angle. In both the bulk and thin-film forms, the switches can be cascaded into a binary array.

The wide-angle switch is based on the high efficiency and high angular selectivity of thick phase gratings. Using holographic techniques it is not difficult to construct such gratings with an angular selectivity of a few millidegrees about the Bragg angle. Forming the gratings in an electro-optic material via the "optical damage" effect makes it possible to change the average index of refraction in the grating region by the application of an electric field. This index change, in turn, causes a change in the Bragg angle of the grating which can be sufficient to take the fixed incident beam out of (or not) Bragg incidence. The resulting deflection of the beam can be made as large as desired by altering the grating spacing.

An analysis of the effect described above, based on the coupled-wave theory of Kogelnik and including the additional effects due to the piezoelectric effect, has been carried out and is presented elsewhere. For out present purposes we need only note that the Bragg angle is determined from $$\cos(\phi - \theta_B) = \lambda_0/2n\Lambda, \quad (1)$$

where $\phi$ is the slant angle and specifies the orientation of the grating relative to the physical boundaries of the crystal, $\theta_B$ is the Bragg angle measured inside the crystal, $\lambda_0$ is the free-space wavelength of the light, $n$ is the refractive index, and $\Lambda$ is the grating period. In the presence of an electric field, these quantities change according to $$\frac{d\theta_B}{dE} = \frac{d\phi}{dE} - \cot(\phi - \theta_B)\left[\frac{d\ln(n)}{dE} + \frac{d\ln\Lambda}{dE}\right], \quad (2)$$

where the change in grating period, $d\ln\Lambda/dE$, and the rotation of the grating, $d\phi/dE$, are due to the piezoelectric effect, and the change in refractive index, $d\ln(n)/dE$, is due to the electrooptic effect. Eq. 2 relates to Bragg angle changes to applied field. Since the incident beam is fixed in direction, this change in Bragg angle is equivalent to a misalignment of the incident beam, and the diffraction efficiency of the grating decreases (increases) if the initial alignment was on (off) Bragg incidence. An estimate of the field required to observe the effect in bulk in LiNbO$_3$ has been made using Kogelnik's expression for the diffraction efficiency and ignoring the piezoelectric effect. A field of the order of 10$^4$ V/cm should suffice for the grating setup of FIG. 4. In the more common arrangement for writing gratings, where the grating planes are perpendicular to the entrance face of the crystal, the electro-optic effect will not produce any deflection and only the piezoelectric effect will contribute.

An experimental arrangement used to demonstrate the switch effect is shown in FIG. 4. Using the indicated geometry, a 6200-line/mm phase grating was written with the grating vector inclined at an angle of 50° with respect to the normal to the sample surface. The sample used was a 25 × 25 × 3-mm LiNbO$_3$ crystal grown from a congruent melt. No attempt was made to optimize the grating efficiency or fix the grating after it was written. The grating was both written and probed with the 4880-A line of an argon-ion laser. The write-only beam is incident at an angle of 24° to the normal to the sample face. The read-and-write beam is normally incident on the sample edge. The argon ion writing beams were approximately 2 mm in diameter at the crystal surfaces. The measured angular half-power points of the resultant grating efficiency curve corresponded to an angular acceptance of about 14 mrad.

After writing the grating, the writing shutter was closed and the intensity of the diffracted portion of the read-and write beam was monitored. Application of a 2000-V 100-$\mu$sec pulse across the 2-mm electrode gap resulted in a 35% reduction of the intensity of the diffracted beam. Adjustment of the angle of incidence of the reading beam so that it was slightly off the Bragg angle with the field off allowed the voltage pulse to cause an increase in the diffracted beam intensity. Thus both normally on and normally off switching arrangements can be used. The oscilloscope 51 trace of the photomultiplier output shows (upper trace) 55 response of the wide-angle switch element to a 1000-V/mm 100-$\mu$ sec pulse. The lower trace 56 was taken with the oscilloscope input shorted out, providing a base line for reference. The modulation of the diffracted beam was about 35%.

REFERENCES

1. I. P. Kaminow and E. H. Turner, Proc. IEEE 54, 1374 (1966); R. W. Dixon, J. Appl. Phys. 38,, 5149 (1967); J. F. St. Ledger and E. A. Ash, Electron. Lett. 4, 99 (1968); M. A. R. P. deBarros and M. G. F. Wilson, Electron. Lett. 7, 267 (1971); J. M. Hammer, Appl. Phys. Lett. 18, 147 (1971); R. A. Mayer, Appl. Opt. 11, 613 (1972); T. Motoki, Appl. Opt. 12, 1472 (1973); N. Uchida and N. Niizeki, Proc. IEEE 61, 1073 (1973).

2. Kuhn, M. L. Dakss, P. F. Heidrich, and B. A. Scott, Appl. Phys. Lett. 17, 265 (1970); D. Hall, A. Yariv, and E. Garmire, Opt. Commun. 1, 403 (1970); F. K. Reinhart and B. I. Miller, Appl. Phys. Lett. 20, 36 (1972); F. R. Gfeller and C. W. Pitt, Electron. Lett. 8, 549 (1972); I.P. Kaminow, J. R. Carruthers, E. H. Turner, and L. W. Stulz, Appl. Phys. Lett. 22, 540 (1973); J. M. Hammer, D. J. Channin, and M. T. Duffy, Appl. Phys. Lett. 23, 176 (1973); W. E. Martin, J. Appl. Phys. 44, 3703 (1973); D. P. GiaRusso and C. S. Kumar, Appl. Phys. Lett. 23, 229 (1973); Y. Ohmura, J. Appl. Phys. 44, 3928 (1973); R. V. Schmidt, I. P. Kaminow, and J. R. Carruthers, Appl. Phys. Lett. 23, 417 (1973); D. A. Wille and M. C. Hamilton, Appl. Phys. Lett. 24, 159 (1974).

3. H. Kogelnik, Bell Syst. Tech. J. 48, 2909 (1969).

SUMMARY

A typical method according to the present invention for directing a beam of optical radiation toward a selected location, and modulating the intensity thereof at the location, comprises directing the beam over a path that includes a Bragg grating, and selectively modifying the angle between the direction at which the beam enters the Bragg grating and a direction of Bragg incidence of the grating. Typically the angle is modified by changing the index of refraction in a portion of the path, by applying an electric or acoustic field in a portion of the path. Typically an electric field is applied; either at the grating, to change the Bragg angle thereof, or in a portion of the path before the beam reaches the Bragg grating, to change the direction at which the beam enters the grating.

Typical apparatus according to the invention for directing a beam of optical radiation toward a selected location, and modulating the intensity thereof at the location, comprises means for directing the beam over a path that includes a Bragg grating, and means for selectively modifying the angle between the direction at which the beam enters the Bragg grating and a direction of Bragg incidence of the grating. Typically the apparatus comprises means for modifying the angle by applying an electric field in a portion of the path; either at the grating, to change the Bragg angle thereof, or in a portion of the path before the beam reaches the Bragg grating, to change the direction at which the beam enters the grating.

The angle modifying means typically comprises a plurality of spaced electrodes located to provide an electric field at the Bragg grating and means for applying different electric potentials to the electrodes. Where the Bragg grating is in a planar optical waveguide, the electrodes typically are located thereover on the surface of the waveguide. Alternatively, where the path is in a planar optical waveguide, the angle modifying means may comprise a pair of spaced elongate electrodes adjacent to the path in a portion before the radiation reaches the Bragg grating, with each electrode extending across the path at a different angle thereto, and means for applying a different electric potential to each electrode. Where the path is in a planar optical waveguide consisting essentially of piezoelectric material, the angle modifying means may comprise an electroacoustic transducer coupled to the waveguide in a region adjacent to the path in a portion before the radiation reaches the Bragg grating, and means for supplying an alternating electric signal to the transducer to provide an acoustic field across the path and thus to change the index of refraction in the portion of the path in the acoustic field.

In typical apparatus the Bragg grating is a phase grating, and typically comprises a holographically written phase grating in either a planar waveguide or a bulk material.

Typical apparatus arranged to direct a beam to a first selected location when the electric field is in a first state and to a second selected location when the field is in a second state, comprises means for selectively providing either the first state or the second state of the electric field at any given instant. Such apparatus may comprise also similar apparatus for directing any beam arriving at the first location on to either a third selected location or a fourth selected location selectively at any given instant, and similar apparatus for directing any beam arriving at the second location on to either a fifth selected location or a sixth selected location selectively at any given instant.

Apparatus for directing first and second beams in a planar optical waveguide to first and second selected locations typically comprises means for directing the first beam to the Bragg grating at its Bragg angle on one side of its axis when a first electric field in a portion of the path before the first beam reaches the Bragg grating is in a first state, to diffract the first beam from the grating on to the first location, and for directing the first beam to the Bragg grating at an angle slightly away from the Bragg angle when the first electric field is in a second state, to permit the first beam to proceed through the grating on to the second location; means for directing the second beam to the Bragg grating at its Bragg angle on the opposite side of its axis when a second electric field in a portion of the path before the second beam reaches the Bragg grating is in a third state, to diffract the second beam from the grating on to the second location, and for directing the second beam to the Bragg grating at an angle slightly away from the Bragg angle when the second electric field is in a fourth state, to permit the second beam to proceed through the grating on to the first location; means for providing selectively either the first state or the second state of the first electric field at any given instant; and means for providing selectively either the first state or the second state of the first electric field at any given instant; and means for providing selectively either the third state or the fourth state of the second electric field at any given instant.

Other typical apparatus for directing first and second beams to first and second selected locations comprises means for applying an electric field at the Bragg grating to provide a first Bragg angle therein when the field is in a first state and to provide a different Bragg angle therein when the field is in a second state; means for directing the first beam to the grating at its first Bragg angle on one side of its axis to be diffracted from the grating on to the first location when the field is in its first state and to proceed through the grating on to the second location when the field is in its second state; means for directing the second beam to the grating at its first Bragg angle on the opposite side of its axis to be diffracted from the grating on to the second location when the field is in its first state and to proceed through the grating on to the first location when the field is in its second state; and means for providing selectively either the first state or the second state of the electric field at any given instant.

Typical apparatus according to the invention for changing the Bragg angle in a phase grating comprises a plurality of spaced electrodes adjacent thereto and means for applying different electric potentials to the electrodes to provide an electric field at the grating and thus to change the average index of refraction therein.

Typical apparatus according to the invention for changing the direction of a beam of light in a portion of its path in a planar optical waveguide comprises a pair of spaced elongate electrodes overlying the path and extending over the path in different directions, and means for applying a different electric potential to each electrode to provide an electric field across the path and thus to change the index of refraction in the portion of the path between the electrodes.

DRAWINGS

All of the figures are schematic views illustrative of typical apparatus according to the present invention.

PREFERRED EMBODIMENTS

Figure 1:
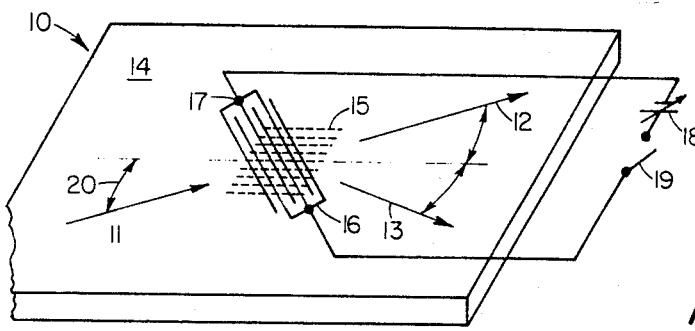
FIG. 1 is a partially perspective view including a typical phase grating and interdigital electrode.

FIG. 1 schematically illustrates typical apparatus 10 according to the present invention for directing a beam 11 of optical radiation toward a selected location 12 or 13, and modulating the intensity thereof at the location, comprises means such as a waveguide 14 for directing the beam over a path 11 that includes a Bragg grating 15, and means 16–19 or 23–26 (FIG. 2) for selectively modifying the angle between the direction at which the beam 11 enters the Bragg grating and a direction of Bragg incidence of the grating as indicated by the angle 20. Typically the apparatus 10 comprises means for modifying the angle by applying an electric field in a portion of the path; either at the grating 15, as in FIG. 1, to change the Bragg angle thereof, or in a portion 21 of the path 11 before the beam reaches the Bragg grating 15, as in FIG. 2, to change the direction (as indicated at 22) at which the beam 11 enters the grating 15.

The angle modifying means typically comprises a plurality of spaced electrodes 16, 17 located to provide an electric field (between them) at the Bragg grating 15 and means such as a voltage source 18 and a switch 19 for applying different electric potentials to the electrodes 16, 17. Where the Bragg grating 15 is in a planar optical waveguide 14, the electrodes 16, 17 typically are located thereover on the surface of the waveguide 14. Alternatively, as in FIG. 2, where the path is in a planar optical waveguide 14, the angle modifying means may comprise a pair of spaced elongate electrodes 23, 24 adjacent to the path 11 in a portion 21 before the radiation reaches the Bragg grating, with each electrode 23, 24 extending across the path 11 at a different angle thereto, and means such as a direct voltage source 25 and switch 26 for applying a different electric potential to each electrode 23, 24. Where the path is in a planar optical waveguide 14C consisting essentially of piezoelectric material, the angle modifying means may comprise an electroacoustic transducer 35 coupled to the waveguide 14C in a region adjacent to the path 11C in a portion 21C before the radiation reaches the Bragg grating, and means 25C, 26C for supplying an alternating electric signal to the transducer 35 to provide an acoustic field across the path 11C, preferably at an oblique angle, and thus to change the index of refraction in the portion of the path at 21C in the acoustic field.

Figure 3:
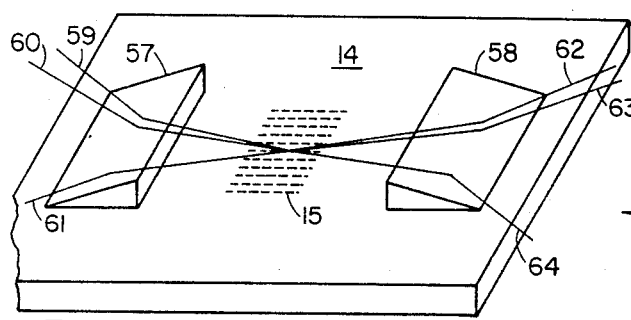
FIG. 3 is a partially perspective view including a grating in a thin film waveguide and prisms for optical coupling therewith.
Figure 4:
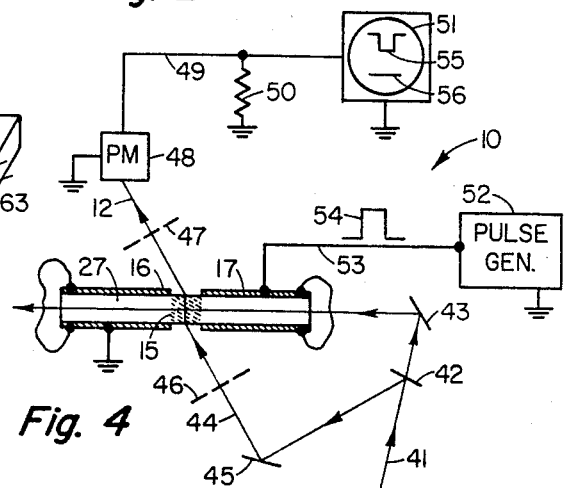
FIG. 4 is a partially sectional view including a grating in a bulk optical element.

In typical apparatus 10 the Bragg grating is a phase grating 15, and typically comprises a holographically written phase grating 15 in either a planar waveguide 14 (FIGS. 1–3) or a bulk material 27 (FIG. 4).

Figure 2:
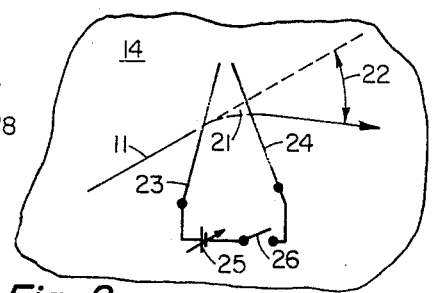
FIG. 2 is a plan view including typical angled deflecting electrodes.
Figure 5:
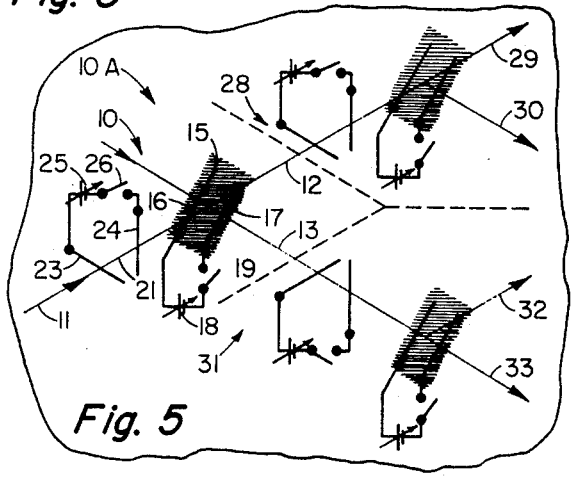
FIGS. 5 and 6 are plan views of typical switching arrangements.

Typical apparatus 10, as in FIGS. 1 and 2, combined as the apparatus 10A in FIG. 5, arranged to direct a beam 11 to a first selected location 12 when the electric field at 21 or 15 is in a first state and to a second selected location 13 when the field at 21 or 15 is in a second state, comprises means 23–26 or 16–19 for selectively providing either the first state or the second state of the electric field at 21 or 15 at any given instant. Such apparatus 10 may comprise also similar apparatus 28 for directing any beam arriving at the first location 12 on to either a third selected location 29 or a fourth selected location 30 selectively at any given instant, and similar apparatus 31 for directing any beam arriving at the second location 13 on to either a fifth selected location 32 or a sixth selected location 33 selectively at any given instant.

Figure 6:
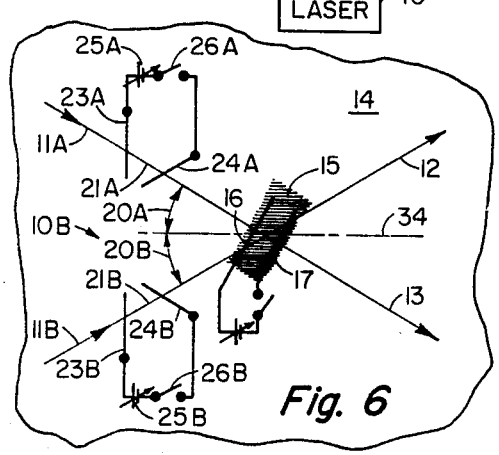

Apparatus 10, as in FIGS. 1 and 2, combined as the apparatus 10B in FIG. 6, for directing first and second beams 11A and 11B, respectively in a planar optical waveguide 14 to first and second selected locations 12 and 13, respectively, typically comprises means such as the waveguide 14 for directing the first beam 11A to the Bragg grating 15 at its Bragg angle 20A on one side of its axis 34 when a first electric field in a portion 21A of the path 11A before the first beam 11A reaches the Bragg grating 15 is in a first state, to diffract the first beam 11A from the grating 15 on to the first location 12, and for directing the first beam 11A to the Bragg grating 15 at an angle slightly away from the Bragg angle 20A when the first electric field at 21A is in a second state, to permit the first beam 11A to proceed through the grating on to the second location 13; means such as the waveguide 14 for directing the second beam 11B to the Bragg grating 15 at its Bragg angle 20B on the opposite side of its axis 34 when a second electric field in a portion 21B of the path 11B before the second beam 11B reaches the Bragg grating 15 is in a third state, to diffract the second beam 11B from the grating 15 on to the second location 13, and for directing the second beam 11B to the Bragg grating 15 at an angle slightly away from the Bragg angle 20B when the second electric field at 21B is in a fourth state, to permit the second beam 11B to proceed through the grating on to the first location 12; means 23A–26A for providing selectively either the first state or the second state of the first electric field at 21A at any given instant; and means 23B–26B for providing selectively either the third state or the fourth state of the second electric field at 21B at any given instant.

Other typical apparatus 10B as illustrated in FIG. 6 for directing first and second beams 11A, 11B to first and second selected locations 12, 13 comprises means 16–19 for applying an electric field at the Bragg grating 15 to provide a first Bragg angle 20A (20B) therein when the field is in a first state and to provide a different Bragg angle therein when the field is in a second state; means such as the waveguide 14 for directing the first beam 11A to the grating 15 at its first Bragg angle 20A on one side of its axis 34 to be diffracted from the grating 15 on to the first location 12 when the field is in its first state and to proceed through the grating 15 on to the second location 13 when the field is in its second state; means such as the waveguide 14 for directing the second beam 11B to the grating 15 at its first Bragg angle 20B on the opposite side of its axis 34 to be diffracted from the grating 15 on to the second location 13 when the field is in its first state and to proceed through the grating 15 on to the first location 12 when the field is in its second state; and means including the switch 19 for providing selectively either the first state or the second state of the electric field at any given instant.

As illustrated in FIG. 1, typical apparatus according to the invention for changing the Bragg angle 20 in a phase grating 15 comprises a plurality of spaced electrodes 16, 17 adjacent thereto and means 18, 19 for applying different electric potentials to the electrodes 16, 17 to provide an electric field at the grating 15 and thus to change the average index of refraction therein.

As illustrated in FIG. 2, typical apparatus according to the invention for changing the direction of a beam of light 11 in a portion of its path in a planar optical waveguide 14 comprises a pair of spaced elongate electrodes 23, 24 overlying the path 11 and extending over the path at 21 in different directions, and means 25, 26 for applying a different electric potential to each electrode 23, 24 to provide an electric field across the path 11 and thus to change the index of refraction in the portion of the path at 21 between the electrodes 23, 24.

Figure 7:
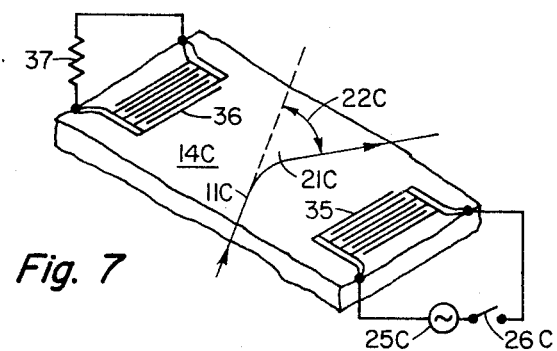
FIG. 7 is a partially perspective view showing an alternative form of some elements in the other figures.

Somewhat similar apparatus, as illustrated in FIG. 7, for changing the direction of a beam of light 11C in a portion of its path in a planar optical waveguide 14C consisting essentially of piezoelectric material, comprises an electroacoustic transducer 35 coupled to the waveguide 14C in a region adjacent to the path 11C, and means 25C, 26C for supplying an alternating electric signal to the transducer 35 to provide an acoustic field across the path 11C, preferably at an oblique angle, and thus to change the index of refraction in the portion of the path at 21C in the acoustic field. Such apparatus can be used in place of the device in FIG. 2 to change the direction (as indicated at 22C) at which the beam 11C enters the grating 15 in apparatus 10, 10A, 10B as in FIGS. 1, 5, and 6. For best control, a nonreflecting energy absorber, such as a receiving transducer 36 connected to a matched load 37, should be coupled to the waveguide 14C in a region adjacent to the path 11C directly across from the transducer 35. The transducers 35, 36 typically comprise interdigital metal electrodes similar to the electrodes 16, 17 in FIG. 1. Depending upon the intended use, the signal source 25C may provide a signal that varies in amplitude or frequency, or in both.

A typical method according to the present invention for directing a beam 11 of optical radiation toward a selected location 12 or 13 and modulating the intensity thereof at the location comprises directing the beam over a path 11 that includes a Bragg grating 15, and selectively modifying the angle between the direction at which the beam 11 enters the Bragg grating and a direction of Bragg incidence of the grating as indicated by the angle 20. Typically the angle is modified by changing the index of refraction in a portion of the path, by applying an electric or acoustic field in a portion of the path. Typically an electric field is applied either at the grating 15, as in FIG. 1, to change the Bragg angle thereof, or in a portion 21 of the path 11 before the beam reaches the Bragg grating 15, as in FIG. 2, to change the direction (as indicated at 22) at which the beam 11 enters the grating 15.

In the experimental arrangement of FIG. 4, a laser 40 provides a coherent beam of light 41 a portion of which passes through a beam splitter 42 and is reflected by a mirror 43 as a read-and-write beam 11 into the bulk photorefractive material 27. The rest of the laser beam 41 is reflected by the beam splitter 42 and forms a writing beam 44 which is reflected by a mirror 45 into the region of the photorefractive material 27 where the Bragg grating 15 is to be formed. A shutter 46 is placed in its open position during the writing to permit the write only beam 44 to proceed to the waveguide 27. After the Bragg grating 15 has been written into the photorefractive material 27, the shutter 46 is closed, and a shutter 47 that is placed in its closed position during the writing process is opened. Another beam 41 from the laser 40 (or at least a portion of it passing through the beam splitter 42) is reflected by the mirror 43 into the photorefractive material 27 and is diffracted by the Bragg grating 15 emerging as an output beam 12, which is detected by a photomultiplier 48. The electrical output of the photomultiplier 48 is connected as indicated at 49 to a load 50 and an oscilloscope 51 which displays the shape of the output at 49. When a pulse generator 52 is connected as indicated at 53 to apply a pulse 54 to the electrode 17 and thereby to provide an electric field at the grating 15 between the electrode 17 and the grounded electrode 16 the output beam 12 from the grating 15 is less efficiently directed toward the photomultiplier 48 because of the change in the Bragg angle at the grating 15 and the output 49 of the photomultiplier 48 is reduced as is indicated by the upper trace 55 in the oscilloscope 51. In a typical example the beam was modulated by about 35 percent. The lower trace 56 indicates zero input to the oscilloscope 51, being taken with the input shorted out.

Similar results were obtained using a planar waveguide 14 in an analogous manner. FIG. 3 shows a convenient way of coupling light beams into and out of the planar waveguide 14. An input prism 57 and an output prism 58, each having a higher index of refraction than the waveguide 14, and in contact with the waveguide 14 provide convenient coupling for the input read beam 59 and write beams 60, 61 and output beams 62, 63, 64 respectively.

As is indicated by the arrows through the symbols for the voltage sources 18, 25, 25A, 25B, 25C variation in any of the voltages, including amplitude or frequency variation in the alternating voltage 25C or in the pulses 54 from the pulse generator 52, may be provided instead of or in addition to switching as indicated schematically at 19, 26, 26A, etc. The switching of course may be provided mechanically, electronically, or in any other convenient manner.

The present invention can be used in many ways besides those described above, and is not confined to switching. Other typical uses for apparatus according to this invention include use as a tunable filter and as a frequency-to-amplitude converter. In the tunable filter, a beam of polychromatic light is incident onto a highly selective grating. In such a grating, high angular sensitivity implies high wavelength selectivity. Only that wavelength for which the angle of incidence onto the grating corresponds to the Bragg angle will be deflected by the grating. A set of angled electrodes set across the path of the light beam before it enters the grating can be used to change the angle of incidence onto the grating, and therefore to change the frequency, or wavelength, that is deflected by the grating. In the frequency-to-amplitude converter, a beam of light is incident onto a grating of low selectivity at an angle of incidence corresponding approximately to the midpoint between the Bragg angle and the angle of the first null in the grating's angular selectivity curve. The deflected beam is taken as the output beam of the device. In the path of the beam, before it enters the grating, is an acoustic surface wave generator which is connected to the electrical input signal of varying frequency. The deflection of the optical beam thus produced changes the angle of incidence onto the grating according to the frequency of the signal, and sweeps the beam over different parts of the grating's angular selectivity curve, producing variations in the amplitude of the output signal which are proportional to the frequency excursion of the input signal.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of directing a beam of optical radiation toward a selected location, and modulating the intensity thereof at the location, comprising
   directing the beam over a path that includes a Bragg grating, and
   selectively modifying the angle between the direction at which the beam enters the Bragg grating and a direction of Bragg incidence of the grating.

2. A method as in claim 1, wherein the angle is modified by changing the index of refraction in an effective portion of the path.

3. A method as in claim 2, wherein the index of refraction is changed by applying an electric or acoustic field in a portion of the path comprising a material that changes its index of refraction in response to changes in the field.

4. A method as in claim 1, wherein the angle is modified by applying an electric field to change the index of refraction in an effective portion of the path comprising a material that changes its index of refraction in response to changes in the field.

5. A method as in claim 1, wherein the grating comprises a material that changes its index of refraction in response to changes in an electric field, and an electric field is applied at the grating, to change the Bragg angle thereof.

6. A method as in claim 1, wherein an electric field is applied in an effective portion of the path comprising a material that changes its index of refraction in response to changes in the field before the beam reaches the Bragg grating, to change the direction at which the beam enters the grating.

7. Apparatus for directing a beam of optical radiation toward a selected location, and modulating the intensity thereof at the location, comprising
   means for directing the beam over a path that includes a Bragg grating, and
   means for selectively modifying the angle between the direction at which the beam enters the Bragg grating and a direction of Bragg incidence of the grating.

8. Apparatus as in claim 7, comprising means for modifying the angle by applying an electric field in an effective portion of the path comprising a material that changes its index of refraction in response to changes in the field.

9. Apparatus as in claim 7, wherein the grating comprises a material that changes its index of refraction in response to changes in an electric field, and comprising means for applying an electric field at the grating, to change the Bragg angle thereof.

10. Apparatus as in claim 7, comprising means for applying an electric field in an effective portion of the path comprising a material that changes its index of refraction in response to changes in the field. before the beam reaches the Bragg grating, to change the direction at which the beam enters the grating.

11. Apparatus as in claim 7, wherein the grating comprises a material that changes its index of refraction in response to changes in an electric field, and comprising a plurality of spaced electrodes located to provide an electric field at the Bragg grating and means for applying different electric potentials to the electrodes.

12. Apparatus as in claim 11, wherein the Bragg grating is in a planar optical waveguide and the electrodes are located thereover on the surface of the waveguide.

13. Apparatus as in claim 7, wherein the path is a planar optical waveguide, comprising a pair of spaced elongate electrodes adjacent to the path in a portion thereof comprising a material that changes its index of refraction in response to changes in an electric field before the radiation reaches the Bragg grating, with each electrode extending across the path at a different angle thereto, and means for applying a different electric potential to each electrode.

14. Apparatus as in claim 7, wherein the path is in a planar optical waveguide consisting essentially of piezoelectric material, comprising an electroacoustic transducer coupled to the waveguide in a region adjacent to the path in a portion before the radiation reaches the Bragg grating, and means for supplying an alternating electric signal to the transducer to provide an acoustic field across the path and thus to change the index of refraction in an effective portion of the path.

15. Apparatus as in claim 7, wherein the Bragg grating is a phase grating.

16. Apparatus as in claim 7, wherein the Bragg grating comprises a holographically written phase grating in a planar waveguide.

17. Apparatus as in claim 7, wherein the Bragg grating comprises a holographically written phase grating in a bulk material.

18. Apparatus as in claim 8, positioned to direct a beam to a first selected location when the electric field is in a first state and to a second selected location when the field is in a second state, comprising means for selectively providing either the first state or the second state of the electric field at any given instant.

19. Apparatus as in claim 18, comprising also an additional such apparatus for directing any beam arriving at the first location on to either a third selected location or a fourth selected location selectively at any given instant, and
   an additional such apparatus for directing any beam arriving at the second location on to either a fifth selected location or a sixth selected location is selectively at any given instant.

20. Apparatus as in claim 7- for directing first and second beams in a planar optical waveguide to first and second selected locations, comprising
   means for directing the first beam to the Bragg grating at its Bragg angle on one side of its axis when a first electric field in an effective portion of the path comprising a material that changes its index of refraction in response to changes in the field before the first beam reaches the Bragg grating is in a first state, to diffract the first beam from the grating on to the first location, and for directing the first beam to the Bragg grating at an angle slightly away from the Bragg angle when the first electric field is in a second state, to permit the first beam to proceed through the grating on to the second location;

means for directing the second beam to the Bragg grating at its Bragg angle on the opposite side of its axis when a second electric field in an effective portion of the path comprising a material that changes its index of refraction in response to changes in the field before the second beam reaches the Bragg grating is in a third state, to diffract the second beam from the grating on to the second location, and for directing the second beam to the Bragg grating at an angle slightly away from the Bragg angle when the second electric field is in a fourth state, to permit the second beam to proceed through the grating on to the first location;

means for providing selectively either the first state or the second state of the first electric field at any given instant; and means for providing selectively either the third state or the fourth state of the second electric field at any given instant.

21. Apparatus as in claim 7, for directing first and second beams to first and second selected locations, wherein the grating comprises a material that changes its index of refraction in response to changes in an electric field, and comprising means for applying an electric field at the Bragg grating to provide a first Bragg angle therein when the field is in a first state and to provide a different Bragg angle therein when the field is in a second state;

means for directing the first beam to the grating at its first Bragg angle on one side of its axis to be diffracted from the grating on to the first location when the field is in its first state and to proceed through the grating on to the second location when the field is in its second state;

means for directing the second beam to the grating at its first Bragg angle on the opposite side of its axis to be diffracted from the grating on to the second location when the field is in its first state and to proceed through the grating on to the first location when the field is in its second state; and means for providing selectively either the first state or the second state of the electric field at any given instant.

22. Apparatus for changing the Bragg angle in a phase grating comprising a material that changes its index of refraction in response to changes in an electric field, comprising a plurality of spaced electrodes adjacent thereto and and means for applying different electric potentials to the electrodes to provide an electric field at the grating and thus to change the average index of refraction therein.

23. Apparatus for changing the direction of a beam of light in a portion of its path in a planar optical waveguide comprising a material that changes its index of refraction in response to changes in an electric field, comprising a pair of spaced elongate electrodes overlying the path and extending over the path in different directions, and means for applying a different electric potential to each electrode to provide an electric field across the path and thus to change the index of refraction in the portion of the path between the electrodes.

* * * * *